US011545014B1

(12) United States Patent
Tignor (10) Patent No.: US 11,545,014 B1
(45) Date of Patent: Jan. 3, 2023

(54) FIRE DETECTION DEVICES AND SYSTEMS AND METHODS FOR THEIR USE

(71) Applicant: Archangel Fire Systems Holdings, LLC, Fort Worth, TX (US)

(72) Inventor: Archie Wayne Tignor, Fort Worth, TX (US)

(73) Assignee: Archangel Fire Systems Holdings, LLC, Fort Worth, TX (US)

( * ) Notice: Subject to any disclaimer, the term of this patent is extended or adjusted under 35 U.S.C. 154(b) by 0 days.

(21) Appl. No.: 17/405,942

(22) Filed: Aug. 18, 2021

Related U.S. Application Data

(60) Provisional application No. 63/066,874, filed on Aug. 18, 2020.

(51) Int. Cl.
*G08B 17/00* (2006.01)
*G08B 17/06* (2006.01)
(Continued)

(52) U.S. Cl.
CPC ............. *G08B 17/06* (2013.01); *G01J 5/10* (2013.01); *G01K 1/14* (2013.01); *G01K 3/005* (2013.01);
(Continued)

(58) Field of Classification Search
CPC .......... G08B 17/06; G08B 7/06; G08B 17/12; G01J 5/10; G01J 2005/0077; G01K 1/14; G01K 3/005
See application file for complete search history.

(56) References Cited

U.S. PATENT DOCUMENTS 7,333,129 B2  2/2008  Miller et al.
10,901,373 B2  1/2021  Locke et al.
(Continued)

FOREIGN PATENT DOCUMENTS

CN   104464163 A   3/2015
CN   104520648 A   4/2015
(Continued)

OTHER PUBLICATIONS

Marty Ahrens, "Reported Structure Firesby Extent of Fire Spread, Occupancy and Loss Rates," Mar. 2013, 31 pages. Fire Analysis and Research Division, National Fire Protection Association (NFPA), Quincy, MA.
(Continued)

*Primary Examiner* — Brian Wilson
(74) *Attorney, Agent, or Firm* — Fogarty LLP (57) ABSTRACT

A fire detection device includes a vented detector housing, with an opening defined in a mounting base. A substance exhaust channel in air flow communication with the opening extends upward from the mounting base. A pressure release turbine includes an impeller operatively disposed in the channel. A rotation sensor senses rotation of the impeller and generates an alert upon detection of a heat level indicated by rotation of the turbine rotor at a predetermined speed. A high pressure and/or heat louver disposed over the opening opens in response to a predetermined heat level. An actuator detects opening of the louver and generates an alert. A thermostatic device disposed in the housing senses, and generates an alert at, a predetermined heat level. A thermal imaging device disposed in the housing senses, and generates an alert at, a predetermined heat level.

20 Claims, 3 Drawing Sheets

(51) Int. Cl.
*G01K 3/00* (2006.01)
*G01K 1/14* (2021.01)
*G08B 17/12* (2006.01)
*G08B 7/06* (2006.01)
*G01J 5/10* (2006.01)
*G01J 5/00* (2022.01)

(52) U.S. Cl.
CPC .............. *G08B 7/06* (2013.01); *G08B 17/12* (2013.01); *G01J 2005/0077* (2013.01)

(56) References Cited

U.S. PATENT DOCUMENTS

| 2010/0328082 | A1* | 12/2010 | Danz | G08B 17/10 340/584 |
|---|---|---|---|---|
| 2019/0336800 | A1 | 11/2019 | Tignor | |

FOREIGN PATENT DOCUMENTS

| CN | 106251555 | A | 12/2016 |
|---|---|---|---|
| CN | 107945449 | A | 4/2018 |
| CN | 107961460 | A | 4/2018 |
| CN | 207690273 | U | 8/2018 |
| CN | 208569832 | U | 3/2019 |
| CN | 208975060 | U | 6/2019 |
| CN | 110555982 | A | 12/2019 |
| CN | 111508184 | A | 8/2020 |
| CN | 212460752 | U | 2/2021 |
| CN | 212460753 | U | 2/2021 |
| CN | 212679909 | U | 3/2021 |
| CN | 213274332 | U | 5/2021 |
| JP | 2002165896 | A | 6/2002 |
| KR | 101288820 | B1 | 7/2013 |
| KR | 101376962 | B1 | 3/2014 |
| KR | 101383144 | B1 | 4/2014 |
| KR | 101478691 | B1 | 1/2015 |
| KR | 10-1732181 | B1 * | 5/2017 |
| KR | 101732181 | B1 | 5/2017 |
| KR | 20180119184 | A | 11/2018 |
| KR | 101999290 | B1 | 7/2019 |
| RU | 2093665 | C1 | 10/1997 |

OTHER PUBLICATIONS

Steve Kerber, PE, "Impact of Ventilation on Fire Behavior in Legacy and Contemporary Residential Construction," Dec. 14, 2010, 405 pages, Underwriters Laboratories, Northbrook, IL.
Richard G. Gann, et al., "Combustion, Fire, and Flammability," Chapter 6, 2015, 18 pages, Jones & Bartlett Learning, LLC, Burlington, MA.
"Fire Dynamics" Created Nov. 17, 2010, Updated Jun. 2, 2021, 10 pages, Fire Research Division, National Institute of Standards and Technology (NIST), U.S. Department of Commerce, Gaithersburg, MD.
Richard H. Taylor, "The Defect in Smoke Alarms," V1.2, Aug. 2009, 9 pages, Taylor Martino Zarzaur, LLC, Mobile, AL.
Arthur Lee, "Smoke Alarm Paradox," Submitted to NFPA 2012 SUPDET Conference, Phoenix, AZ on Mar. 5, 2012, 5 pages, U.S. Consumer Product Safety Commission, Rockville, MD.
"Smoke Alarms Fail in a Third of House Fires," Nov. 30, 2019, 15 pages, BBC News, London, United Kingdom, available at https://www.bbc.com/news/uk-england-50598387.
Marty Ahrens, et al., "Home Structure Fires," Nov. 2020, 2 pages, National Fire Protection Association (NFPA), Quincy, MA.
Marty Ahrens, "Smoke Alarms in US Home Fires," Feb. 2021, 15 pages, National Fire Protection Association (NFPA), Quincy, MA.

* cited by examiner

Fig. 1

FIRE DETECTION DEVICES AND SYSTEMS AND METHODS FOR THEIR USE

CROSS-REFERENCE TO RELATED APPLICATION

This application claims benefit of U.S. Provisional Patent Application Ser. No. 63/066,874, entitled Fire Detection Device, filed Aug. 18, 2020, which is incorporated herein by reference.

TECHNICAL FIELD

The present disclosure relates generally to fire detection, and more particularly to fire detection devices and systems and methods for their use.

BACKGROUND

Fire has long been a destructive force that can be hazardous to humans. The evolution of legacy home construction and materials in modern homes presents an increased danger to human life. In the United States alone, between 2014 and 2018, on an annual basis, roughly 353,100 residential fires have caused over 2,620 deaths and nearly 11,030 injuries, and 7.2 billion dollars in property damage. Modern structures, including residences, are filled with synthetic and petroleum-based materials that undergo pyrolysis and gasification effects of fire at an accelerated rate compared to legacy materials. When subjected to fire and heat these synthetic materials produce toxic and highly combustible fuel-rich smoke. This fuel rich smoke exacerbates the heat release rate, growth, spread, noxious nature, and mortal danger of fire.

The nature of fire's danger is that in the modern home, an entire room can be engulfed in flame and combust due to an event called flashover. A burning cigarette, for example, dropped onto a couch, may cause flames and ultimately result in a flashover event within 150 seconds of being dropped. Even before flashover occurs, within 60 seconds, a room may be sufficiently filled with smoke, heat, and toxic gases such that a human, previously laying in bed, may rise, inhale, and immediately become asphyxiated by the "smoke layer" consisting of heat, fuel rich smoke, gas, and particulate. Within 90 seconds the average lay person will die even if trying to escape due to the mortal atmosphere within three feet of the floor.

Fire is an exothermic chemical reaction between a fuel, heat, and oxygen resulting in combustion. The initiation and continuance of combustion require four components as depicted in the fire tetrahedron. The mechanics of fire, and consequently its detection and suppression, can be better understood through the tetrahedron. According to National Institute of Standards and Technology (NIST) and UL, LLC, the tetrahedron is a geometric representation of the required elements for fire to exist, a common model used to describe the inputs necessary for fire, is comprised of four elements, heat, fuel, and oxygen, resulting in a continuous exothermic chemical chain reaction. According to NIST, removal or reduction of any of the facets of the fire tetrahedron and fire cannot exist and will extinguish a fire completely or, at a minimum, slow its growth.

To protect human life from the dangers of fire, smoke detection devices are frequently used. Among others, these devices may include photoelectric sensors that detect particulate matter and ionization detectors which detect the presence of elements in sampled air that bind to an ion contained within a chamber. These methods were developed over 30 years ago when legacy homes were constructed of, and contained primarily wood materials. Burning wood produces a fine particulate smoke that is not fuel rich. Modern homes are constructed and filled with primarily petroleum and synthetic materials. When ignited, these petroleum and synthetic materials produce a thick particulate black smoke that does not bind to ions, thus limiting the effectiveness of ionization detection-based technology. An additional shortcoming of legacy detection systems is that they may detect fires and alert human occupants in a dwelling at a time that is too late for the occupant to safely evacuate. For example, if a fire has been present long enough, the smoke layer, containing fuel rich smoke, toxic gas, mortal heat, and particulate may be as little or even less than four feet from the floor. With a single inhalation this smoke may cause instant death, disorientation, unconscious or inability to navigate to an exit from the dwelling. The presence of modern synthetic and petroleum-based materials within a dwelling (now prevalent) exacerbates this problem by releasing fuel rich smoke that quickly consumes breathable oxygen.

Further, typical smoke-detection devices, such as ionization and photoelectric systems, tend to give a false alarm on events that are not actual fires, such as an overheating frying pan or oven. These false alarms result in extreme cost to local first responders and desensitize occupants to the alarm methods, even to the point of disabling the detector altogether. These existing systems rely on the detection of smoke or gas as a byproduct of ignition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a fire detection device may include a vented detector housing made up of a mounting base, (a) vented side panel(s) extending from the mounting base, a substance exhaust channel opening defined in the mounting base and a detector housing bottom plate secured to the vented side panel(s). The detector housing bottom plate is spaced apart from the mounting base, defining the vented detector housing between the mounting base and the detector housing bottom plate. A substance exhaust channel is in air flow communication with the substance exhaust channel opening, extending upward from the mounting base. An exhaust louver may be disposed at an upper extent of this substance exhaust channel.

The fire detection device may include a pressure release turbine that includes an impeller operatively disposed in the substance exhaust channel, a turbine rotor axel coupled to the impeller for rotation of the turbine rotor axel in response to heat rising through the substance exhaust channel, and a rotation sensor electrically coupled to a turbine rotor on the turbine rotor axel. This rotation sensor is configured to sense rotation of the impeller and configured to generate an alert upon detection of a first predetermined heat level indicated by rotation of the turbine rotor at a predetermined speed.

The fire detection device may also further include a high pressure and/or heat louver disposed over the substance exhaust channel opening and a high pressure and/or heat louver actuator. The high pressure and/or heat louver configured to open in response to a second predetermined heat level and the high pressure and/or heat louver actuator configured to detect opening of the high pressure and/or heat louver at the second predetermined heat level and generate an alert upon detection of opening of the high pressure and/or heat louver at the second predetermined heat level The fire detection device may also further include a thermostatic device, such as a heat activated digital actuator, disposed in the housing configured and arranged in the detector housing to sense a heat level in the detector housing and configured to generate an alert upon detection of a third predetermined heat level.

The fire detection device may also further include a thermal imaging device, such as a thermal camera, disposed in the housing, configured and arranged in the detector housing to sense a heat level in the detector housing and configured to generate an alert upon detection of a fourth predetermined heat level.

These first, second, third and fourth heat levels may all be the same heat level, or may be two or more various heat levels.

An alarm may also be disposed in the fire detection device housing, configured to receive the alert and issue an audible and/or visual alarm. In embodiments where the thermostatic device is a heat activated digital actuator, or the like, a power source may be disposed in the housing and electrically coupled to the high pressure and/or heat louver actuator, heat activated digital actuator, thermal imaging device and/or alarm, etc. Also, a test button may be electrically coupled to the power source and configured to light a light upon pressing and in response to the power source having a predetermined power level.

Thereby, consistent with the present devices and systems, a method for detecting a fire in a compartment may include enabling flow of fire-heated air in the compartment through a vented housing of a fire detection device mounted on the ceiling of the compartment. This flow may be upward, through a substance exhaust channel to a pressure release turbine to rotate a pressure release turbine impeller operatively disposed in the substance exhaust channel, and thereby rotate a turbine rotor axel coupled to the impeller in response to heat rising through the substance exhaust channel. A rotation sensor electrically coupled to a turbine rotor on the turbine rotor axel may sense rotation of the impeller and generate an alert in response to a first predetermined heat level indicated by rotation of the turbine rotor at a predetermined speed, or the like. In this fire detection method, a high pressure and/or heat louver disposed over an opening of the substance exhaust channel may open in response to a second predetermined heat level in the detector housing and the same or another alert may be generated upon detection of the second predetermined heat level and/or activation of the high pressure and/or heat louver. Also, in such a method, a thermostatic device disposed in the housing may detect a third predetermined heat level in the detector housing and generate the same or another alert upon detection of the third predetermined heat level in the detector housing. Further in such methods, a thermal imaging device disposed in the housing may sense a fourth predetermined heat level in the detector housing and generate the same or another alert upon detection of the fourth predetermined heat level in the detector housing.

Herein, a fire detection system may include a fire detection device controller in electronic communication with such a fire detection device. In such a fire detection system the rotation sensor may be configured to generate the alert to the controller upon detection of the first predetermined heat level indicated by rotation of the turbine rotor at a predetermined speed. Also, in such a fire detection system the high pressure and/or heat louver actuator may be configured to generate the alert to the controller upon detection of opening of the high pressure and/or heat louver at the second predetermined heat level. The thermostatic device may be configured to generate the alert to the controller upon detection of the third predetermined heat level, in such a fire detection system. In such a fire detection system the thermal imaging device may also be configured to generate the alert to the controller upon detection of the fourth predetermined heat level.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the present devices, systems and methods relate generally to fire detection, and more particularly to fire detection devices and systems and methods for their use. The fire detection devices disclosed herein differ from traditional "smoke" detectors. The present fire detection devices work off of heat, and heat energy, which is the first by-product of any ignition or fire. Since excess heat is an accurate indicator of a compartment fire, it is a better indicator.

In the event of a fire in a compartment, convection causes warmer air to rise toward the top of the compartment, this heated air is constantly moving and seeking out low heat/low pressure. As noted, smoke-detection devices, such as ionization and photoelectric systems, tend to give a false alarm on events that are not actual fires, such as an overheating frying pan or oven. Embodiments of the present fire detection devices will not raise a false alert in these situations. Further, embodiments of the present fire detection devices will not raise a false alarm on any event other than a true ignition or fire. As also noted, existing systems rely on the detection of smoke or gas as a byproduct of ignition. Since heat is the first by-product of an ignition or fire, waiting to alert on smoke or gas is a late response to an ignition or fire.

Embodiments of the present fire detection devices work directly from heat and high pressure caused by heat accumulation. In a structural fire, heat begins to rise from the point of ignition to the ceiling of the compartment. The heat becomes dark smoke as the ignition begins pyrolysis, converting the biomass into a heated, fuel-rich smoke that rises to the ceiling. This high-heat high-pressure fuel-rich smoke accumulates rapidly at ceiling level, forming the aforementioned smoke layer, and begins descending toward lower levels in the compartment.

Embodiments of the present fire detection devices provide rapid detection of the above-referenced process by measuring and responding to calibrated levels of heat or pressure at ceiling level, such as within one to four inches of the ceiling. This detection is accomplished through one or more methods that are combined in a single housing. This housing may have a mounting base, which mounts to the ceiling. The housing may be vented, such as through vented side panels that have straight line slits, be made up of bars, or the like, from the top to the bottom of the housing and completely encircling the housing. The housing may also have an oblong release opening in the base. This opening may be flanged and may have an encased exhaust channel that flows into open attic space.

Within a housing, such as the one described above, four methods of fire detection may be implemented. These methods may "see" heat indicative of a fire, "feel" heat indicative of a fire, detect "movement" caused by heat indicative of a fire, etc. One method of fire detection may be a pressure release turbine. A pressure release turbine may be installed within an oblong pressure-release channel in the top of the device housing. A damper for this release may be calibrated to open at a predetermined pressure or heat level. Once opened, the high-pressure heat that builds up at the ceiling level may escape through the channel, thereby rotating the turbine. A second method of fire detection may be a high pressure and/or heat louver disposed at an opening of the pressure release channel to sense a heat level in the detector housing, open in response to detection of a predetermined heat level and generate an alert. A third method of fire detection may be thermostatic. A thermostatic device, such as, for example, a heat activated digital actuator, which may take the form of an electronic device that detects a temperature and uses an actuator to turn something on or off using a digital signal. This heat activated digital actuator is installed in the housing and set to temperatures commensurate with ignition and fire within the compartment. A fourth method of fire detection may be thermal imaging. A thermal camera may be installed in the housing. The thermal camera observes the heat within the device housing. These various alerts may activate an alarm within the structure, initiate a phone call to local fire and/or police, activate a smart phone alarm, and/or actuate an exhaust and fire suppression system. That is, in various embodiments, the thermostatic device, thermal imaging camera, pressure and/or heat louver and pressure release turbine are configured to generate an alert upon detection of heat and/or pressure levels consistent with a rogue fire event, which may be, for example, an unintended, unexpected, and/or unanticipated fire event. Additionally, one or more of these mechanisms may feed live data, such as via a cell phone, to a remote alert device and/or first responders to indicate the growth and expansion of the fire.

Figure 1:
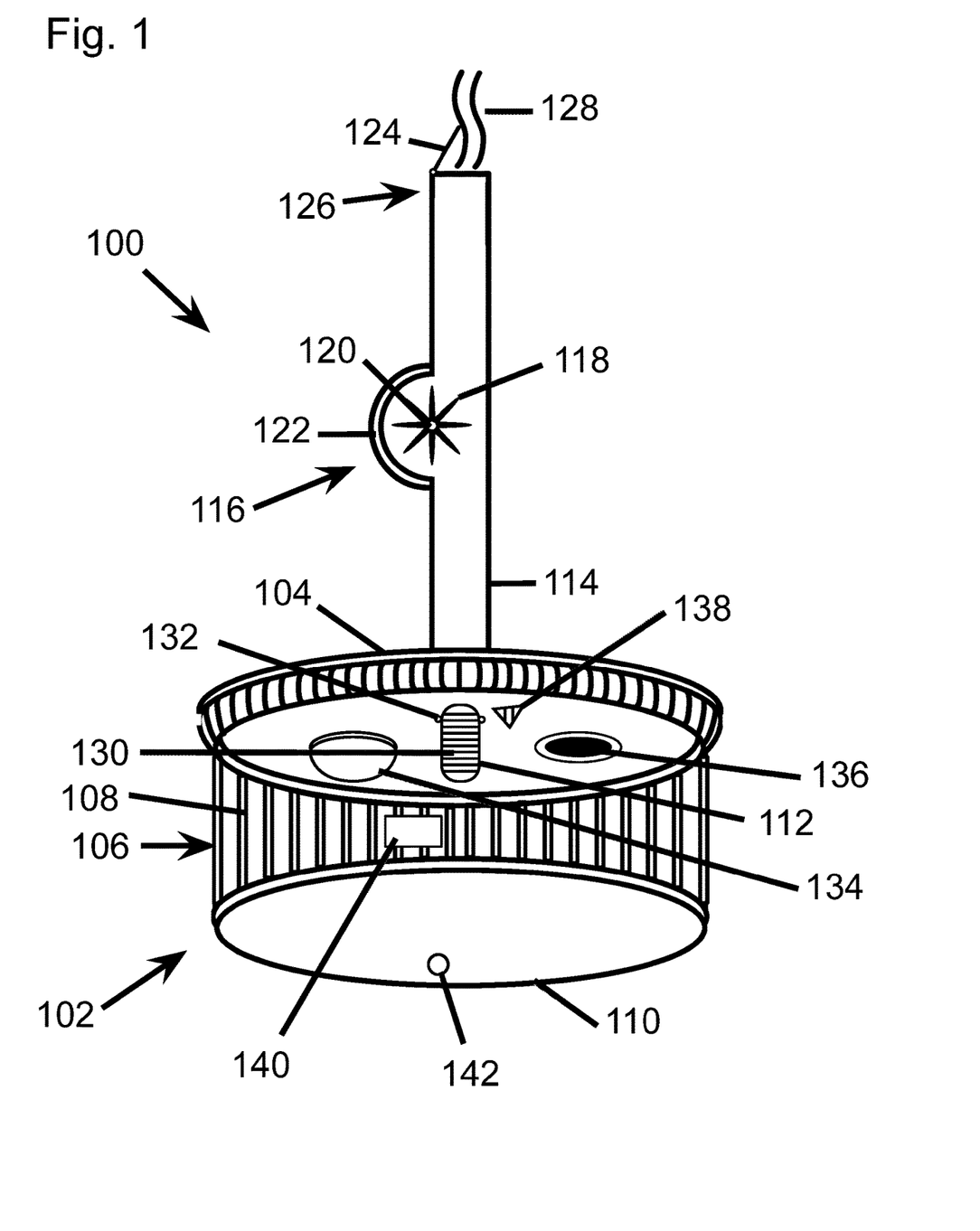
FIG. 1 is a diagrammatic, partially fragmented, illustration of an example fire detection device, according to some embodiments.

FIG. 1 is a diagrammatic illustration of example fire detection device 100, according to some embodiments. Fire detection device 100, itself, includes vented detector housing 102, which in some embodiments may be about five inches in diameter and two inches in depth. In accordance with embodiments of the present systems and methods, housing 102 may include mounting base 104, which in various embodiments is adapted to be secured to a surface, such as a high point in a compartment, for example the ceiling. Integral (circumferential) vented side panel(s) 106, such as may be made up of downwardly extending bars 108 and/or or narrow panels, extend from mounting base 104 to the housing bottom plate 110. In partially fragmented FIG. 1 panel(s)/bars 106/108 are only shown around a portion of base and bottom plate 104 and 110, for purposes of clarity. Detector housing bottom plate 110 may be secured to vented side panel(s) 106, spaced apart from mounting base 104, defining vented detector housing 102 between the mounting base and the detector housing bottom plate. In such a configuration, vented side panel(s) 106, enables air flow through fire detection device 100 which allow air, gas, smoke, and heat to enter fire detection device 100. Substance exhaust channel opening 112, which in accordance with embodiments of the present systems and methods may act as a turbine channel opening, may be defined in mounting base 104. Opening 112 may be up to four inches in length and up to two inches in width in some embodiments. Substance exhaust channel 114, which may act as a turbine venting channel, may extend upward from mounting base 104, in air flow communication with substance exhaust channel opening 112.

In accordance with embodiments of the present systems and methods, pressure release turbine 116 is operatively deployed to use substance exhaust channel 114 for fire detection. Impeller 118 (i.e., a set of hubbed turbine vanes) is operatively disposed in the substance exhaust channel, such as on turbine rotor axel 120 coupled to the hub of the vanes for rotation of the turbine rotor axel in response to heat rising through the substance exhaust channel. Rotary (i.e., rotation) sensor 122 is electrically coupled to the turbine rotor mounted on turbine rotor axel 120. Rotary sensor 122 is configured to sense rotation of vanes 118 and generates an alert upon detection of a first predetermined heat level, such as indicated by rotation of the turbine rotor at a predetermined speed due to heat rising through substance exhaust channel 114. In various embodiments of the present systems and methods, rotary sensor 122 may take the form of a stator or the like, and rotation of the rotor mounted on turbine rotor axel 120 may induce a current, voltage or electrical impulses with may be used as a signal to a controller (see controller 212, discussed below), circuitry associated with pressure release turbine 116, or the like, to provide the alert upon detection of the first predetermined heat level, indicated by rotation of the turbine rotor at the aforementioned predetermined speed due to heat rising through substance exhaust channel 114. Other pressure release turbine sensor arrangements may be employed, such as a magnetic sensor that makes use of one or more Hall effect sensors, one or more gyroscopic sensors, one or more inertial sensors, or the like, deployed in conjunction with rotor axel 120 and/or rotary sensor 122. Additionally, or alternatively, any movement of vanes 118, and hence the rotor, with respect to rotary sensor 122, may be detected as an indication of fire in embodiments where a preset, or predetermined, tension or friction, such as exerted on axel 120 may prevent rotation of vanes 118 unless heat flow through substance exhaust channel 114 is sufficient to be indicative of a fire in a compartment in which device 100 is installed. Hinged exhaust louver 124 may be disposed at upper extent 126 of substance exhaust channel 114 to facilitate and enable flow of heated air through pressure release turbine vanes 118 and substance outflow 128 to an attic, or the like, of the compartment's structure. Hinged exhaust louver 124 is pushed open by heated air, but falls shut at normal temperatures to avoid (attic) debris entering device 100, from above. Additionally, (live) data such as provided by pressure release turbine 116 may be feed, such as via a cell phone, to a remote alert device and/or first responders to indicate the growth and expansion of the fire. For example, the speed of turbine 118 may be indicative of the heat being generated by a fire and status of the fire may be updated to emergency services and/or first responders, via such mechanisms.

In various embodiments of the present systems and methods, fire detection device 100 may also include hinged high pressure and/or heat louver 130 disposed at (i.e., over) substance exhaust channel opening 112. High pressure and/or heat louver 130 may include, incorporate and/or be operatively coupled to a high pressure and/or heat louver actuator 132, and thereby, be configured to sense a heat level in detector housing 102. As noted, fire-heated air is constantly moving and seeking out low heat/low pressure. High pressure and/or heat louver 130 may open in response to detection of a second predetermined heat level, which may be the same as the aforementioned predetermined heat level, or a different predetermined heat level. Opening of high pressure and/or heat louver 130 may actuate (i.e., close a circuit of) high pressure and/or heat louver actuator 132, and thereby generate an alert upon detection of the second predetermined heat level. Additionally, activation of hinged high pressure and/or heat louver 130 may result in (live) data being feed, such as via a cell phone, to a remote alert device and/or first responders to indicate the growth and expansion of the fire.

Also, in the same, or other various embodiments, fire detection device 100 may also employ thermostatic device 134, such as may be disposed in housing 102, for example, mounted in the mounting base 104, as illustrated. This thermostatic device may be a heat activated digital actuator adapted to issue a digital electronic signal at a third predetermined temperature, which may be the same, or different from the aforementioned first and/or second predetermined heat level, or a different predetermined heat level. Thermostatic device 134 is configured, and arranged in detector housing 102, to sense a heat level, for example 115 to 125° F., in the detector housing, and thereby, at (e.g., within one inch of) the ceiling of the compartment in which the device is installed. Further, thermostatic device 134 is configured to generate an alert upon detection of the aforementioned third predetermined heat level, which, as noted, may be the same, or a different, predetermined heat level as the aforementioned first and/or second predetermined heat level. Additionally, (live) data from thermostatic device 134, such as temperature data, may be feed, such as via a cell phone, to a remote alert device and/or first responders to indicate the growth and expansion of the fire.

In these same, or other various embodiments, fire detection device 100 may also include thermal imaging device 136 (e.g., a thermal camera, or the like), such as, disposed in housing 102, for example, mounted in the mounting base 104. Thermal camera 136 may be configured, and arranged in detector housing 102, to sense a heat level, for example 115 to 125° F., in the detector housing, and thereby, at (e.g., within one inch of) the ceiling of the compartment in which the device is installed. Further, thermal camera 136 is configured to generate an alert upon detection of a fourth predetermined heat level, which may be the same as, or different from, the aforementioned first, second and/or third predetermined heat levels. Thermal camera 136 may take the form of a thermal camera sensor, or the like, which may be or employ an array of infrared thermal sensors (e.g., an 8×8 array of IR thermal sensors). Additionally, (live) data from thermal camera 136, such as temperature data, may be feed, such as via a cell phone, to a remote alert device and/or first responders to indicate the growth and expansion of the fire.

In accordance with various embodiments of the present systems and methods, fire detection device 100 may also include alarm 138 disposed in housing 102, such as mounted on housing mounting base 104, as illustrated. Alarm 138 may be configured to receive the alert from any or all of pressure release turbine 116, pressure and/or heat louver 130, thermostatic device 134 and thermal imaging device 136. In response to (any of these) alerts alarm 138 may issue an audible and/or visual alarm. An audible alarm may at least be audible in the compartment in which , fire detection device 100 is installed, but may also be audible in other areas of the compartment's structure.

Fire detection device 100, in various embodiments is hardwired into the electrical system of the structure in which it is installed. However, in some embodiments fire detection device 100 may include a power source, such as a battery disposed in battery housing 140, within housing 102. The battery (housing) may be electrically coupled to high pressure and/or heat louver actuator 130, heat activated digital actuator 134, thermal imaging device 136 and/or alarm 138, to provide power to each of these elements. Notably, in accordance with some embodiments, pressure release turbine 116 may not need power input as the signal is generated by the rotor rotating in the stator, as discussed above. However, in some embodiments the battery (housing) may also be electrically coupled to the pressure release turbine as well, such as to provide power to circuitry thereof In accordance with various embodiments of the present systems and methods, fire detection device 100 may also include a test button 142, or the like, electrically coupled to the power source and configured to light a light (e.g., a light emitting diode (LED)) upon pressing and in response to the power source having a predetermined power level. This LED may be incorporated into test button 142 itself. Associated test circuity may further enable an indication of power level, such by lighting the LED (or LEDs of) different colors for the power source's power level (e.g., green for high, yellow for depleted, red for insufficient, unlit for dead, or the like). Alternatively, a number of (separate) LEDs could be lit to indicate a power level (e.g., three for high, two for depleted, one for insufficient and zero for dead, or the like).

Fire detection device 100 may include a circuit board (not shown) used to carry out the various functions described herein, such as providing alerts, and the like. Further, this circuit board, or similar functionality, may provide an alert (e.g., a chirp) when hardwire electricity is not being provided to the device, and other such functionality.

Figure 2:
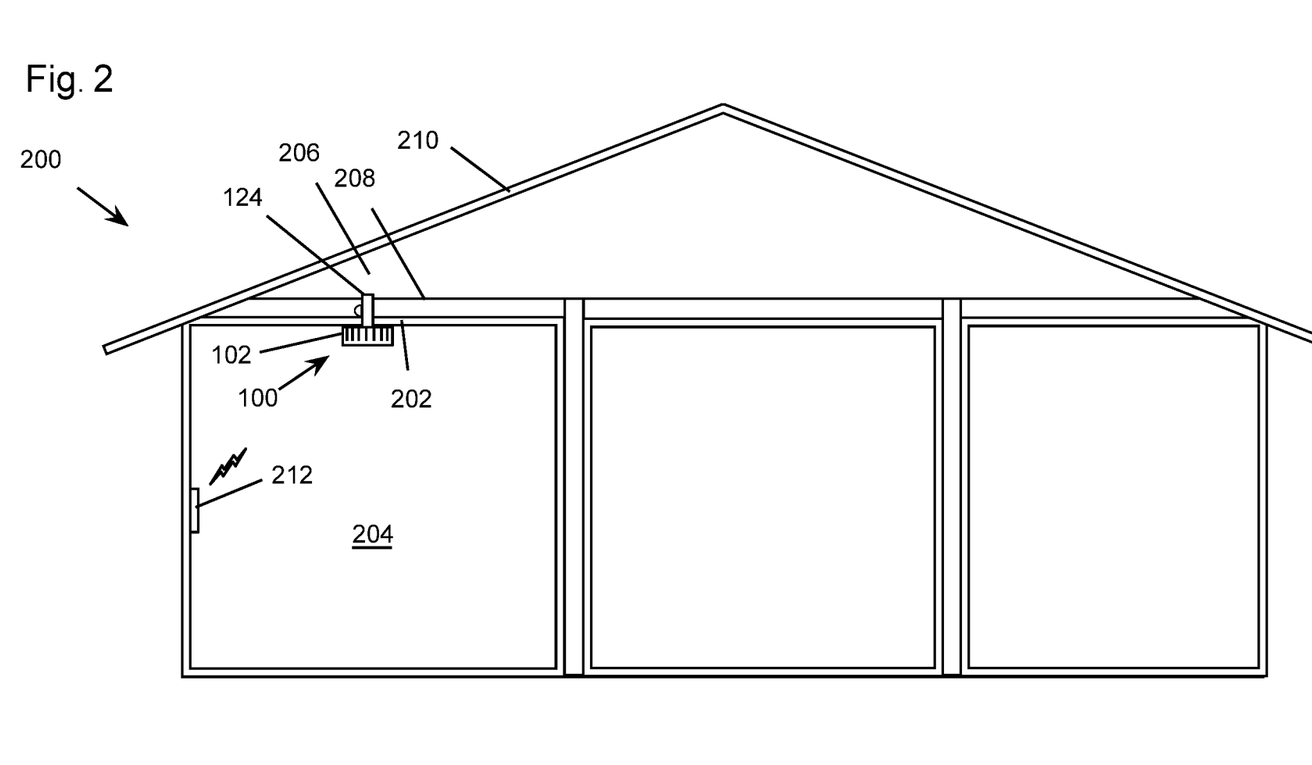
FIG. 2 is a diagrammatic, partially fragmented, illustration of an example structure employing an embodiment of the present fire detection device, according to some embodiments; and, FIG. 3 is a flowchart of a process for fire detection employing an embodiment of the present fire detection device, according to some embodiments.

FIG. 2 is a diagrammatic illustration of example structure 200 employing an embodiment of present fire detection device 100, according to some embodiments. Fire detection device 100, in various embodiments is hardwired into the electrical system of structure 200. As noted, fire detection device 100 comprises housing 102 having, with additional reference back to FIG. 1, bottom housing plate 110 and base 104, which allows for mounting the fire detection device 100 to ceiling 202 of structure compartment 204. As noted, fire detection device 100 further comprises vented side panel(s) 106, which allow air, gas, smoke, and heat to enter mounted fire detection device 100. Heat activated digital actuator 134 and thermal camera 136 are mounted on base plate 104 within fire detection device 100. Base plate 104 also has turbine channel opening 112 that is coupled to turbine venting channel 114, which provides a pathway for air, smoke, gas, and heat between turbine channel opening 112 and hinged exhaust louver 124 Turbine channel opening 112 may have hinged high pressure and/or heat louver 130, which may be calibrated or non-calibrated and which may also act as a fire detection mechanism, as described above.

When a high pressure builds up in compartment 204 during a fire, then air, smoke, gas, and heat will, again with additional reference back to FIG. 1, open high pressure and/or heat louver 130 and flow through turbine venting channel 114, which will cause turbine vanes 118 to rotate. This will then turn turbine rotor 120, which will activate rotary sensor 122. The air, smoke, gas, and heat will pass from turbine channel opening 112, through turbine venting channel 114, and then out of hinged exhaust louver 124. As a result, the air, smoke, gas, and heat within compartment 204 will become vented substance outflow 128, instead of being trapped in compartment 204. To such end, turbine venting channel 114 may extend through ceiling 202, so that exhaust louver 124 is positioned in attic space 206, above attic floor 208. Alternatively, turbine venting channel 114 may extend through structure roof 210 so that exhaust louver 124 vents to the outside.

When activated, one or more of rotary sensor 122, high pressure and/or heat louver 130, heat activated digital actuator 134 and/or thermal camera 136, may activate an alarm within the home, initiate a phone call to local fire and/or police, and/or trigger an exhaust and fire suppression system, any of which may be accomplished through controller 212. Further, control of fire detection device 100, such as adjustment of the previously discussed predetermined heat levels, and/or the like may also be controlled through controller 212.

In the event of a fire, convection causes warmer air to rise toward the top of compartment 204. Once detector 100 has been triggered to indicate the potential presence of a fire or other relevant environmental event, detector 100, may, in accordance with some embodiments of the present systems and methods, notify controller 212 of an alarm state. Detector 100 may be connected to controller 212 by wire, or may utilize any means of wireless communication, including, for example, WiFi, Bluetooth, ZigBee, RF, or other means.

Embodiments of controller 212, or the like, as described herein, may be implemented or executed, at least in part, by one or more computer systems, or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein. For example, device 100 may include a circuit board that may include a processor and memory used to carry out the various functions described herein, such as providing alerts, and the like.

Further, various elements of the present devices, systems and/or methods may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Figure 3:
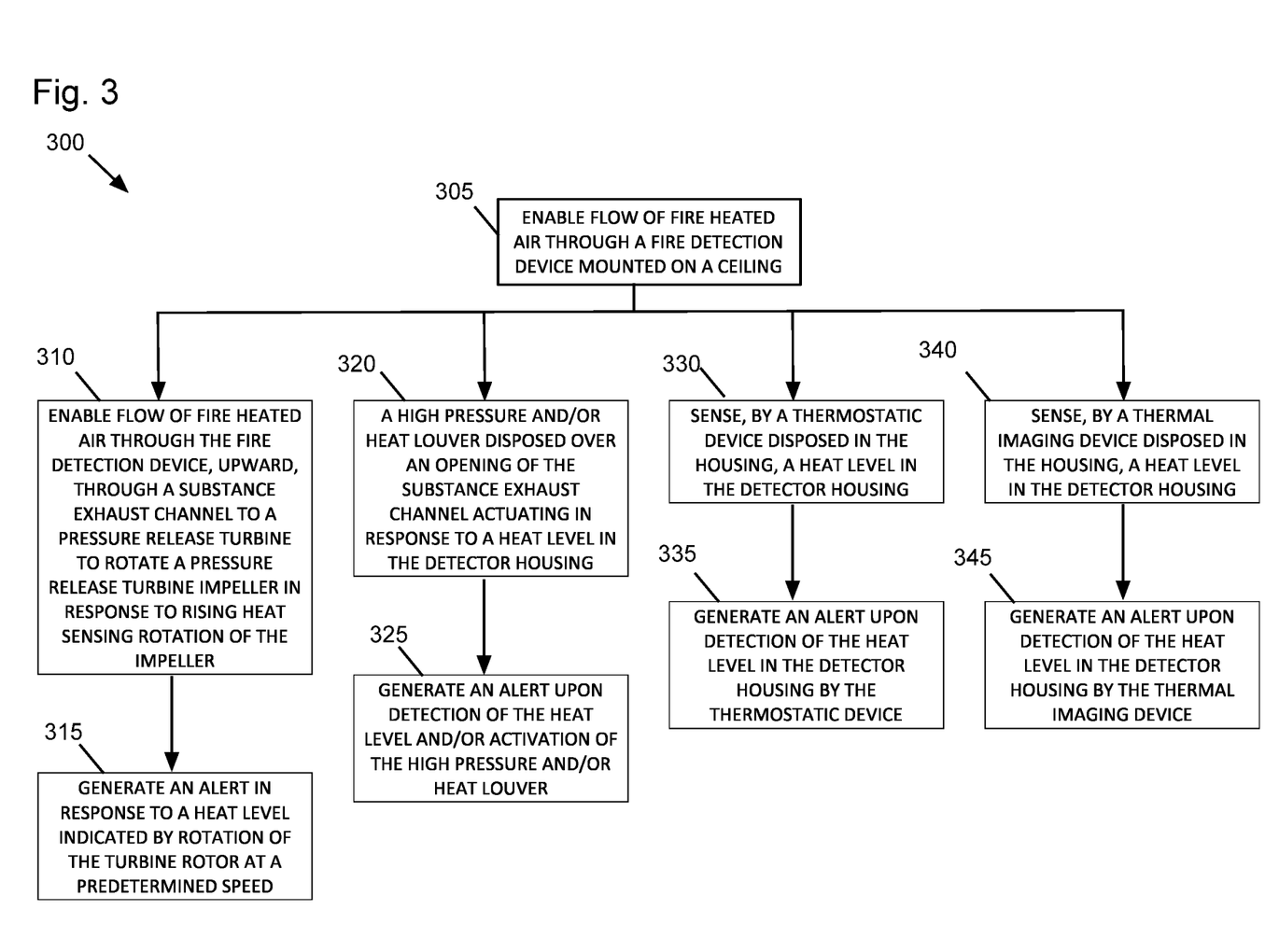

FIG. 3 is a flowchart of process 300 for fire detection employing an embodiment of the present fire detection device, according to some embodiments. Therein, detecting a fire in a compartment (204) may include enabling, at 305, flow of fire-heated air in the compartment through a vented housing (102) of a fire detection device (100) mounted on the ceiling (202) of the compartment.

At 315, this enablement of flow of fire-heated air through the fire detection device vented housing (102) allows the fire-heated air to flow upward, through a substance exhaust channel (114) to a pressure release turbine to rotate a pressure release turbine (118) impeller operatively disposed in the substance exhaust channel. This in turn, rotates a turbine rotor axel (120) coupled to the impeller in response to heat rising through the substance exhaust channel, and a rotation sensor (122) electrically coupled to a turbine rotor on the turbine rotor axel, senses rotation of the impeller, and, at 315, generates an alert in response to a first predetermined heat level indicated by rotation of the turbine rotor at a predetermined speed.

At 320, a high pressure and/or heat louver (130) disposed at (i.e., over) an opening (112) of the substance exhaust channel (114) may open in response to a second predetermined heat level in the detector housing. Whereupon, an alert may be generated at 325, in response to the detection of the second predetermined heat level and/or activation of a sensor (132) by the high pressure and/or heat louver opening at 315.

At 330, a thermostatic device (134) disposed in the housing, may sense a third predetermined heat level in the detector housing, and at 335, an alert may be generated in response to detection of the third predetermined heat level in the detector housing at 325 by the thermostatic device. For example, at 115 to 125° F., in the detector housing, and thereby, at (e.g., within one inch of) the ceiling of the compartment in which the device is installed, an alert may be generated at 335 by the thermostatic device.

At 340, a thermal imaging device (136) disposed in the housing, may sense a fourth predetermined heat level in the detector housing, and at 345, an alert may be generated in response to detection of the fourth predetermined heat level in the detector housing at 340 by the thermal imaging device. . For example, at 115 to 125° F., in the detector housing, and thereby, at (e.g., within one inch of) the ceiling of the compartment in which the device is installed, an alert may be generated at 345 by the thermal camera.

Consistent with the forgoing, the detected first, second, third and fourth heat levels may all or some be the same or various heat levels, for example, at 115 to 125° F.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fire detection device comprising:
    a vented detector housing comprising:
        a mounting base;
        at least one vented side panel extending from the mounting base;
        a substance exhaust channel opening defined in the mounting base; and
        a detector housing bottom plate secured to the at least one vented side panel, spaced apart from the mounting base, defining the vented detector housing between the mounting base and the detector housing bottom plate;
    a substance exhaust channel in air flow communication with the substance exhaust channel opening, extending upward from the mounting base; and
    a pressure release turbine comprising:
        an impeller operatively disposed in the substance exhaust channel;
        a turbine rotor axel coupled to the impeller for rotation of the turbine rotor axel in response to heat rising through the substance exhaust channel; and
    a rotation sensor electrically coupled to a turbine rotor on the turbine rotor axel and configured to sense rotation of the impeller and configured to generate a first alert upon detection of a first predetermined heat level indicated by rotation of the turbine rotor at a predetermined speed.

2. The fire detection device of claim 1, further comprising:
    a high pressure and/or heat louver disposed over the substance exhaust channel opening and configured to open in response to a second predetermined heat level; and
    a high pressure and/or heat louver actuator configured to detect opening of the high pressure and/or heat louver and generate a second alert upon detection of opening of the high pressure and/or heat louver.

3. The fire detection device of claim 1, further comprising a thermostatic device disposed in the vented detector housing configured and arranged in the vented detector housing to sense a heat level in the vented detector housing and configured to generate a second alert upon detection of a third predetermined heat level.

4. The fire detection device of claim 3, wherein the thermostatic device comprises a heat activated digital actuator.

5. The fire detection device of claim 1, further comprising a thermal imaging device disposed in the vented detector housing, configured and arranged in the vented detector housing to sense a heat level in the vented detector housing and configured to generate a second alert upon detection of a fourth predetermined heat level.

6. The fire detection device of claim 5, wherein the thermal imaging device is a thermal camera.

7. The fire detection device of claim 1, further comprising:
    a high pressure and/or heat louver disposed over the substance exhaust channel opening; and
    a high pressure and/or heat louver actuator configured to:
        sense a heat level in the vented detector housing;
        open the high pressure and/or heat louver in response to detection of a second predetermined heat level; and
        generate a second alert upon detection of the second predetermined heat level.

8. The fire detection device of claim 7, further comprising a thermostatic device disposed in the vented detector housing configured and arranged in the vented detector housing to sense a heat level in the vented detector housing and configured to generate a third alert upon detection of a third predetermined heat level.

9. The fire detection device of claim 8, further comprising a thermal imaging device disposed in the vented detector housing configured and arranged in the vented detector housing to sense a heat level in the vented detector housing and configured to generate fourth alert upon detection of a fourth predetermined heat level.

10. The fire detection device of claim 9, wherein at least two of the first, second, third, and fourth predetermined heat levels are the same heat level.

11. The fire detection device of claim 9, further comprising an alarm disposed in the vented detector housing configured to receive the first, second, third, and fourth alert and issue an audible and/or visual alarm.

12. The fire detection device of claim 11, wherein the thermostatic device is a heat activated digital actuator and the fire detection device further comprises a power source disposed in the vented detector housing and electrically coupled to the high pressure and/or heat louver actuator, heat activated digital actuator, thermal imaging device, and/or alarm.

13. The fire detection device of claim 12, further comprising a test button electrically coupled to the power source and configured to light a light upon pressing and in response to the power source having a predetermined power level.

14. The fire detection device of claim 1, further comprising an alarm disposed in the vented detector housing configured to receive the first alert and issue an audible and/or visual alarm.

15. The fire detection device of claim 1, further comprising an exhaust louver disposed at an upper extent of the substance exhaust channel.

16. A fire detection system comprising:
a fire detection device controller in electronic communication with a fire detection device; and,
the fire detection device, comprising:
  a vented detector housing comprising:
    a mounting base
    at least one vented side panel extending from the mounting base;
    a substance exhaust channel opening defined in the mounting base; and
    a detector housing bottom plate secured to the at least one vented side panel, spaced apart from the mounting base, defining the vented detector housing between the mounting base and the detector housing bottom plate;
  a substance exhaust channel in air flow communication with the substance exhaust channel opening, extending upward from the mounting base; and
  a pressure release turbine comprising:
    an impeller operatively disposed in the substance exhaust channel;
    a turbine rotor axel coupled to the impeller for rotation of the turbine rotor axel in response to heat rising through the substance exhaust channel; and
    a rotation sensor electrically coupled to a turbine rotor on the turbine rotor axel and configured to sense rotation of the impeller and configured to generate a first alert to the controller upon detection of a first predetermined heat level indicated by rotation of the turbine rotor at a predetermined speed.

17. The fire detection system of claim 16, further comprising:
a high pressure and/or heat louver disposed over the substance exhaust channel opening, configured to open in response to a second predetermined heat level;
a high pressure and/or heat louver actuator configured to detect opening of the high pressure and/or heat louver and generate a second alert to the controller upon detection of opening of the high pressure and/or heat louver;
a thermostatic device disposed in the vented detector housing configured and arranged in the vented detector housing to sense a heat level in the vented detector housing and configured to generate a third alert to the controller upon detection of a third predetermined heat level;
a thermal imaging device disposed in the vented detector housing, configured and arranged in the vented detector housing to sense a heat level in the vented detector housing and configured to generate a fourth alert to the controller upon detection of a fourth predetermined heat level.

18. The fire detection system of claim 17, wherein at least two of the first, second, third, and fourth predetermined heat levels are the same heat level.

19. A method for detecting a fire in a compartment comprising:
enabling flow of fire-heated air in the compartment through a vented housing of a fire detection device mounted on the ceiling of the compartment, upward, through a substance exhaust channel to a pressure release turbine to rotate a pressure release turbine impeller operatively disposed in the substance exhaust channel, and thereby rotate a turbine rotor axel coupled to the pressure release turbine impeller in response to heat rising through the substance exhaust channel;
sensing rotation of the pressure release turbine impeller by a rotation sensor electrically coupled to a turbine rotor on the turbine rotor axel; and
generating first alert in response to a first predetermined heat level indicated by rotation of the turbine rotor at a predetermined speed;
opening a high pressure and/or heat louver disposed over an opening of the substance exhaust channel in response to a second predetermined heat level in the vented housing;
generating a second alert upon detection of the second predetermined heat level and/or activation of the high pressure and/or heat louver;
sensing, by a thermostatic device disposed in the vented housing, a third predetermined heat level in the vented housing;
generating a third alert upon detection of the third predetermined heat level in the vented housing by the thermostatic device;
sensing, by a thermal imaging device disposed in the vented housing, a fourth predetermined heat level in the vented housing; and
generating a fourth alert upon detection of the fourth predetermined heat level in the vented housing by the thermal imaging device.

20. The method of claim 19, wherein at least two of the first, second, third, and fourth predetermined heat levels are the same heat level.

* * * * *